United States Patent
Chang et al.

(10) Patent No.: US 9,656,209 B2
(45) Date of Patent: May 23, 2017

(54) THREE-WAY CATALYST AND ITS USE IN EXHAUST SYSTEMS

(71) Applicant: Johnson Matthey Public Limited Company, London (GB)

(72) Inventors: Hsiao-Lan Chang, Berwyn, PA (US); Hai-Ying Chen, Conshohocken, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/016,371

(22) Filed: Feb. 5, 2016

(65) Prior Publication Data

US 2016/0228818 A1 Aug. 11, 2016

Related U.S. Application Data

(60) Provisional application No. 62/113,016, filed on Feb. 6, 2015.

(51) Int. Cl.

| | | |
|---|---|---|
| *B01D 53/50* | (2006.01) | |
| *B01D 53/94* | (2006.01) | |
| *B01J 21/04* | (2006.01) | |
| *B01J 21/06* | (2006.01) | |
| *B01J 23/10* | (2006.01) | |
| *B01J 23/44* | (2006.01) | |
| *B01J 23/46* | (2006.01) | |
| *B01J 23/50* | (2006.01) | |
| *B01J 23/56* | (2006.01) | |
| *B01J 23/63* | (2006.01) | |
| *B01J 29/00* | (2006.01) | |
| *B01J 37/02* | (2006.01) | |
| *B01J 35/00* | (2006.01) | |
| *B01J 29/068* | (2006.01) | |
| *B01J 29/74* | (2006.01) | |
| *B01J 35/04* | (2006.01) | |
| *B01J 37/00* | (2006.01) | |
| *F01N 3/021* | (2006.01) | |
| *F01N 3/035* | (2006.01) | |
| *F01N 3/08* | (2006.01) | |
| *F01N 3/10* | (2006.01) | |
| *F01N 3/20* | (2006.01) | |

(52) U.S. Cl.
CPC .......... *B01D 53/945* (2013.01); *B01J 23/464* (2013.01); *B01J 23/63* (2013.01); *B01J 29/068* (2013.01); *B01J 29/7415* (2013.01); *B01J 35/0006* (2013.01); *B01J 35/04* (2013.01); *B01J 37/0009* (2013.01); *B01J 37/0018* (2013.01); *B01J 37/0063* (2013.01); *B01J 37/0244* (2013.01); *B01J 37/0248* (2013.01); *F01N 3/021* (2013.01); *F01N 3/035* (2013.01); *F01N 3/0821* (2013.01); *F01N 3/0842* (2013.01); *F01N 3/101* (2013.01); *F01N 3/2066* (2013.01); *B01D 53/944* (2013.01); *B01D 53/9477* (2013.01); *B01D 2255/104* (2013.01); *B01D 2255/1023* (2013.01); *B01D 2255/1025* (2013.01); *B01D 2255/2092* (2013.01); *B01D 2255/407* (2013.01); *B01D 2255/502* (2013.01); *B01D 2255/504* (2013.01); *B01D 2255/9022* (2013.01); *B01D 2255/912* (2013.01); *B01D 2255/915* (2013.01); *B01J 2229/186* (2013.01); *Y02T 10/22* (2013.01)

(58) Field of Classification Search
CPC . B01J 21/04; B01J 21/066; B01J 23/10; B01J 23/44; B01J 23/464; B01J 23/50; B01J 23/56; B01J 23/63; B01J 29/00; B01D 53/501; B01D 53/944; B01D 53/954
USPC ..... 502/66, 74, 87, 304, 327, 330, 333, 339, 502/347, 349, 439, 527.12, 527.123; 423/213.2; 422/170, 171
See application file for complete search history.

(56) References Cited

U.S. PATENT DOCUMENTS

| | | | | |
|---|---|---|---|---|
| 5,013,705 | A * | 5/1991 | Koberstein | .......... B01D 53/945 |
| | | | | 423/213.5 |
| 5,116,800 | A * | 5/1992 | Williamson | ......... B01D 53/945 |
| | | | | 423/213.5 |
| RE34,804 | E | 12/1994 | Lachman et al. | |
| 5,407,880 | A * | 4/1995 | Ikeda | ................... B01D 53/944 |
| | | | | 423/239.2 |
| 5,492,883 | A | 2/1996 | Wu | |
| 5,565,394 | A | 10/1996 | Lachman et al. | |
| 5,633,217 | A | 5/1997 | Lynn | |
| 5,656,244 | A | 8/1997 | Cole | |
| 5,772,972 | A | 6/1998 | Hepburn et al. | |
| 5,883,037 | A | 3/1999 | Chopin et al. | |

(Continued)

FOREIGN PATENT DOCUMENTS

| | | |
|---|---|---|
| EP | 1129774 A1 | 9/2001 |
| WO | 2006070201 A2 | 7/2006 |
| WO | 2015066312 A8 | 5/2015 |

*Primary Examiner* — Cam N. Nguyen
(74) *Attorney, Agent, or Firm* — Jimmie Johnson

(57) ABSTRACT

A three-way catalyst is disclosed. The three-way catalyst comprises a palladium component comprising palladium and a ceria-zirconia-alumina mixed or composite oxide, and also comprises a rhodium component comprising rhodium and a zirconia-containing material. The palladium component and the rhodium component are coated onto a silver-containing extruded molecular sieve substrate. The invention also includes an exhaust system comprising the three-way catalyst. The three-way catalyst results in improved hydrocarbon storage and conversion, in particular during the cold start period.

10 Claims, No Drawings

(56) References Cited

U.S. PATENT DOCUMENTS

| | | | | |
|---|---|---|---|---|
| 5,894,068 A * | 4/1999 | Kharas | ............... | B01D 53/9418 422/169 |
| 6,074,973 A | 6/2000 | Lampert et al. | | |
| 6,150,288 A | 11/2000 | Suzuki et al. | | |
| 6,261,989 B1 * | 7/2001 | Tanaka | ............... | B01D 53/945 29/890 |
| 6,294,140 B1 * | 9/2001 | Mussmann | .......... | B01D 53/945 423/213.5 |
| 6,306,794 B1 | 10/2001 | Suzuki et al. | | |
| 6,348,430 B1 * | 2/2002 | Lindner | ............... | B01D 53/945 502/304 |
| 6,413,483 B1 * | 7/2002 | Brisley | ............... | B01D 53/9422 423/213.2 |
| 6,617,276 B1 | 9/2003 | Ballinger et al. | | |
| 7,022,646 B2 * | 4/2006 | Li | ...................... | B01D 53/9422 502/339 |
| 7,265,073 B2 * | 9/2007 | Yoshikawa | .......... | B01D 53/945 502/527.15 |
| 7,276,212 B2 * | 10/2007 | Hu | ...................... | B01D 53/9454 422/168 |
| 7,396,516 B2 * | 7/2008 | Fisher | .................. | B01D 53/945 123/1 R |
| 7,517,510 B2 * | 4/2009 | Chen | .................... | B01D 53/945 422/168 |
| 7,550,124 B2 * | 6/2009 | Chen | .................... | B01D 53/945 422/168 |
| 7,758,834 B2 * | 7/2010 | Chen | .................... | B01D 53/945 423/213.2 |
| 7,795,172 B2 * | 9/2010 | Foong | .................. | B01D 53/945 502/302 |
| 7,816,295 B2 * | 10/2010 | Liu | ...................... | B01D 53/944 502/400 |
| 7,875,250 B2 * | 1/2011 | Nunan | .................. | B01D 53/945 422/168 |
| 8,007,750 B2 * | 8/2011 | Chen | .................... | B01D 53/945 423/239.1 |
| 8,038,951 B2 * | 10/2011 | Wassermann | .......... | B01J 21/066 422/168 |
| 8,066,963 B2 * | 11/2011 | Klingmann | .......... | B01D 53/944 423/212 |
| 8,207,078 B2 * | 6/2012 | Lu | ........................ | B01D 53/945 502/302 |
| 8,227,374 B2 * | 7/2012 | Sato | .................... | B01D 53/945 502/100 |
| 8,394,348 B1 * | 3/2013 | Nunan | .................. | B01D 53/945 423/213.2 |
| 8,546,296 B2 * | 10/2013 | Yabuzaki | ............ | B01D 53/945 423/213.5 |
| 8,603,423 B2 * | 12/2013 | Andersen | ................ | B01J 23/30 423/213.2 |
| 8,617,496 B2 * | 12/2013 | Wei | .......................... | B01J 23/63 423/213.2 |
| 8,640,440 B2 * | 2/2014 | Klingmann | .......... | B01D 53/944 422/170 |
| 8,828,343 B2 * | 9/2014 | Liu | ...................... | B01D 53/945 423/213.5 |
| 8,833,064 B2 * | 9/2014 | Galligan | .............. | B01D 53/945 423/213.5 |
| 8,906,330 B2 * | 12/2014 | Hilgendorff | ............ | B01J 23/464 423/213.5 |
| 8,950,174 B2 * | 2/2015 | Hilgendorff | ......... | B01D 53/945 423/213.2 |
| 9,012,350 B2 * | 4/2015 | Aoki | .................... | B01D 53/865 502/304 |
| 9,040,003 B2 * | 5/2015 | Andersen | ................ | B01J 23/30 423/210 |
| 2002/0057997 A1 * | 5/2002 | Mizuno | ................ | B01D 53/945 422/171 |
| 2007/0129236 A1 | 6/2007 | Liu et al. | | |
| 2007/0191220 A1 | 8/2007 | Bog et al. | | |
| 2008/0072578 A1 * | 3/2008 | Kumar | ................. | B01D 53/945 60/299 |
| 2009/0280978 A1 * | 11/2009 | Nakamura | .......... | B01D 53/945 502/303 |
| 2011/0126527 A1 * | 6/2011 | Hilgendorff | ....... | B01D 53/9422 60/299 |
| 2011/0171092 A1 | 7/2011 | Wakita et al. | | |
| 2011/0217216 A1 * | 9/2011 | Liu | ...................... | B01D 53/945 423/213.5 |
| 2012/0055141 A1 * | 3/2012 | Hilgendorff | ............ | B01J 23/58 60/301 |
| 2012/0117953 A1 | 5/2012 | Andersen et al. | | |
| 2012/0128558 A1 * | 5/2012 | Nunan | ................. | B01D 53/945 423/213.5 |
| 2012/0308439 A1 | 12/2012 | Chen et al. | | |
| 2013/0108530 A1 | 5/2013 | Chang et al. | | |
| 2013/0236380 A1 * | 9/2013 | Golden | .................. | F01N 3/101 423/213.2 |
| 2014/0065042 A1 | 3/2014 | Andersen et al. | | |
| 2014/0228209 A1 * | 8/2014 | Aoki | .................... | B01D 53/865 502/304 |
| 2015/0118119 A1 | 4/2015 | Chang et al. | | |
| 2015/0132188 A1 * | 5/2015 | Howard | ............. | B01D 53/9445 422/115 |
| 2015/0158023 A1 * | 6/2015 | Rajaram | ............. | B01J 37/0244 422/171 |
| 2015/0352532 A1 * | 12/2015 | Hatfield | ................ | B01D 53/945 502/242 |

* cited by examiner

THREE-WAY CATALYST AND ITS USE IN EXHAUST SYSTEMS

FIELD OF THE INVENTION

The invention relates to a three-way catalyst, its use in exhaust systems for internal combustion engines, and a method for treating an exhaust gas from an internal combustion engine.

BACKGROUND OF THE INVENTION

Internal combustion engines produce exhaust gases containing a variety of pollutants, including hydrocarbons, carbon monoxide, and nitrogen oxides ("$NO_x$"). Emission control systems, including exhaust gas catalysts, are widely utilized to reduce the amount of these pollutants emitted to atmosphere. A commonly used catalyst for gasoline engine applications is the "three-way catalyst" (TWC). TWCs perform three main functions: (1) oxidation of CO; (2) oxidation of unburnt hydrocarbons; and (3) reduction of $NO_x$ to $N_2$.

TWCs, like other exhaust gas catalysts, typically achieve very high efficiencies once they reach their operating temperature (typically, 200° C. and higher). However, these systems are relatively inefficient below their operating temperature (the "cold start" period). As even more stringent national and regional legislation lowers the amount of pollutants that can be emitted from diesel or gasoline engines, reducing emissions during the cold start period is becoming a major challenge. Thus, methods for reducing the level of $NO_x$ and hydrocarbons emitted during cold start condition continue to be explored.

For cold start hydrocarbon control, hydrocarbon (HC) traps including zeolites as hydrocarbon trapping components have been investigated. In these systems, the zeolite component adsorbs and stores hydrocarbons during the start-up period and releases the stored hydrocarbons when the exhaust temperature is high enough to desorb hydrocarbons. The desorbed hydrocarbons are subsequently converted by a TWC component either incorporated into the HC trap or by a separate TWC placed downstream of the HC trap.

For instance, U.S. Pat. No. 5,772,972 discloses a hybrid system of hydrocarbon trapping material and palladium based three-way catalyst material. U.S. Pat. No. 6,617,276 teaches a catalyst structure comprising a first layer consisting essentially of a hydrocarbon-adsorbing zeolite and a K, Rb, or Cs active metal that is impregnated on the zeolite, at least one additional layer consisting essentially of at least one platinum group metal, and a catalyst substrate on which the first layer and the one or more additional layers are disposed. In EP 1129774, a hydrocarbon adsorbing member is taught that comprises a zeolite having $SiO_2$:$Al_2O_3$ molar ratio of 100 or more and an average primary particle diameter of 1 µm or less of, and that it is free from a monovalent metallic element. U.S. Pat. No. 6,074,973 teaches a catalyzed hydrocarbon trap material comprising palladium and silver dispersed on a high surface area metal oxide support and a zeolite material such as one or more of ZSM-5, Beta, Y, and other suitable zeolites.

U.S. Appl. Pub. No. 2012/0117953 A1 teaches a three-way catalyst that comprises an extruded solid body comprising 10-100 weight percent of at least one binder/matrix component, 5-90 weight percent of a zeolitic molecular sieve, a non-zeolitic molecular sieve or a mixture of any two or more thereof, and 0-80 weight percent of an optional stabilized ceria. The catalyst comprises at least one precious metal and optionally at least one non-precious metal, wherein: (i) the at least one precious metal is carried in one or more coating layer(s) on a surface of the extruded solid body; (ii) at least one metal is present throughout the extruded solid body and at least one precious metal is also carried in one or more coating layer(s) on a surface of the extruded solid body; or (iii) at least one metal is present throughout the extruded solid body, is present in a higher concentration at a surface of the extruded solid body and at least one precious metal is also carried in one or more coating layer(s) on the surface of the extruded solid body. Co-pending U.S. patent application Ser. No. 14/528,139 discloses a three-way catalyst comprises a silver-containing extruded zeolite substrate. In addition, U.S. Appl. Pub. No. 2012/0308439 A1 teaches a cold start catalyst that comprises (1) a zeolite catalyst comprising a base metal, a noble metal, and a zeolite, and (2) a supported platinum group metal catalyst comprising one or more platinum group metals and one or more inorganic oxide carriers.

As with any automotive system and process, it is desirable to attain still further improvements in exhaust gas treatment systems, particularly under cold start conditions. We have discovered a new three-way catalyst that provides enhanced cleaning of the exhaust gases from internal combustion engines.

SUMMARY OF THE INVENTION

The invention is a three-way catalyst for use in an exhaust system. The three-way catalyst comprises a palladium component comprising palladium and a ceria-zirconia-alumina mixed or composite oxide; and a rhodium component comprising rhodium and a zirconia-containing material. The palladium component and the rhodium component are coated onto a silver-containing extruded molecular sieve substrate. The invention also includes an exhaust system comprising the three-way catalyst, and a method of treating an exhaust gas with the three-way catalyst.

DETAILED DESCRIPTION OF THE INVENTION

The three-way catalyst of the invention comprises a palladium component comprising palladium and a ceria-zirconia-alumina mixed or composite oxide. The ceria-zirconia-alumina mixed or composite oxide may be produced by any known method. For instance, the ceria-zirconia-alumina mixed or composite oxide may be produced by impregnating cerium and zirconium salt precursors onto alumina oxides (see, for example, Japanese Kokai No. 7-300315), by precipitating cerium-zirconium hydroxides and then mixing with alumina (see, for example, U.S. Pat. No. 5,883,037), by co-precipitation of cerium/zirconium/aluminium salt precursors (see, for example, U.S. Pat. Nos. 6,306,794 and 6,150,288, and PCT Intl. Appl. WO 2006/070201), by surface coating alumina on cerium-zirconium oxides (see, for example, U.S. Appl. Pub. No. 2007/0191220 A1), by ball-milling a cerium-zirconium composite oxide together with γ-alumina powder (see, for example, U.S. Appl. Pub. No. 2011/0171092 A1), or by flame spray pyrolysis of cerium/zirconium/aluminium precursors.

Preferably, the ceria-zirconia-alumina mixed or composite oxide is produced by first combining a cerium (IV) compound and a zirconium (IV) compound with a slurry of aluminum oxide at a temperature greater than 40° C. to produce a reaction slurry; contacting the reaction slurry with a precipitating agent to precipitate insoluble cerium and zirconium compounds onto the aluminum oxide and form cerium-zirconium-aluminum oxide particles; and calcining the cerium-zirconium-aluminum oxide particles to produce a ceria-zirconia-alumina mixed or composite oxide, as described in U.S. Appl. Pub. No. 2013/0108530, the teachings of which are incorporated herein by reference.

Optionally, the ceria-zirconia-alumina mixed or composite oxide may contain a rare earth, alkaline earth, or transition metal compound. For instance, the aluminum oxide precursor for the ceria-zirconia-alumina mixed or composite oxide may be a rare earth or alkaline earth-stabilized aluminum oxide, for example containing a rare earth or alkaline earth metal selected from the group consisting of lanthanum, neodymium, praseodymium, yttrium, barium, and strontium. Preferably, the rare earth or alkaline earth-stabilized aluminum oxide comprises from 0.1 to 20 weight percent rare earth or alkaline earth metal. A rare earth, alkaline earth, or transition metal compound may also be added to the preparation of the ceria-zirconia-alumina mixed or composite oxide, for instance adding a rare earth metal is preferably selected from the group consisting of lanthanum, neodymium, praseodymium and yttrium compounds or a transition metal is preferably selected from the group consisting of iron, manganese, cobalt and copper compounds.

Preferably, the ceria-zirconia-alumina mixed or composite oxide comprises a $CeO_2:ZrO_2:Al_2O_3$ weight ratio ranging from 0.1-70:0.1-70:95-10, more preferably 5-60:5-60:90-20. The molar ratio of Ce:Zr is preferably within the range of 0.05 to 19, and more preferably is from 0.25 to 1.5.

Palladium in the palladium component is preferably incorporated into the ceria-zirconia-alumina mixed or composite oxide and may be loaded onto the ceria-zirconia-alumina oxide by any known means, the manner of addition is not considered to be particularly critical. For example, a palladium compound (such as palladium nitrate) may be added to the ceria-zirconia-alumina oxide by impregnation, adsorption, incipient wetness, precipitation, spray drying, or the like to produce the palladium component. Suitable loadings of palladium are 0.04 to 7.1 g/liter (1 to 200 g/ft$^3$) catalyst volume.

The three-way catalyst of the invention also comprises a rhodium component comprising rhodium and a zirconia-containing material. The zirconia-containing material may be any known zirconia-containing material, such as zirconium oxide or any zirconium oxide-containing mixed or composite oxides. The zirconia-containing material may be a rare earth or alkaline earth-stabilized zirconium oxide, for example containing a rare earth or alkaline earth metal selected from the group consisting of cerium, lanthanum, neodymium, praseodymium, yttrium, barium, and strontium. A ceria-zirconia mixed or composite oxide is a particularly preferred zirconia-containing material. The ceria-zirconia mixed or composite oxide may be any known ceria-zirconia oxide. For the ceria-zirconia mixed or composite oxide, the molar ratio of Ce:Zr is preferably within the range of 0.01 to 19, and more preferably is from 0.25 to 1.5.

The rhodium in the rhodium component is preferably incorporated into the zirconia-containing material and may be loaded onto the zirconia-containing material by any known means, the manner of addition is not considered to be particularly critical. For example, a rhodium compound (such as rhodium nitrate) may be added to a zirconia-containing material (such as ceria-zirconia oxide) by impregnation, adsorption, incipient wetness, precipitation, spray drying, or the like to produce the palladium component. Suitable loadings of rhodium are 0.04 to 7.1 g/liter (1 to 200 g/ft$^3$) catalyst volume.

The palladium component and the rhodium component are coated onto a silver-containing extruded molecular sieve substrate.

The molecular sieve of the silver-containing extruded molecular sieve substrate may be any natural or a synthetic molecular sieve, including zeolites, and is preferably composed of aluminum, silicon, and/or phosphorus. The molecular sieves typically have a three-dimensional arrangement of $SiO_4$, $AlO_4$, and/or $PO_4$ that are joined by the sharing of oxygen atoms. The molecular sieve frameworks are typically anionic, which are counterbalanced by charge compensating cations, typically alkali and alkaline earth elements (e.g., Na, K, Mg, Ca, Sr, and Ba) and also protons. Other metals (e.g., Fe, Ti, and Ga) may be incorporated into the framework of the molecular sieve to produce a metal-incorporated molecular sieve (e.g., a titanosilicalite).

Preferably, the molecular sieve is selected from an aluminosilicate zeolite, a metal-substituted aluminosilicate zeolite, an aluminophosphate zeolite, a metal-substituted aluminophosphate zeolite, a silicoaluminophosphate zeolite, or a metal-substituted silicoaluminophosphate zeolite. Molecular sieves having a Framework Type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, MFI, FER, MWW, EUO, CON, BEA, FAU, MOR, and EMT, as well as mixtures or intergrowths of any two or more, are particularly preferred. Most preferably, the molecular sieve has a Framework Type of an AEI (e.g., SAPO-18, SSZ-39), a CHA (e.g., SAPO-34, SSZ-13), a CON (e.g., SSZ-33), a LEV (e.g., SAPO-35), a BEA (e.g., beta zeolite), a FAU (e.g., zeolite Y), or MFI (e.g., ZSM-5).

Preferred molecular sieves include SAPO-34, SSZ-33, SSZ-13, SSZ-39, beta zeolite, ZSM-5 zeolite, or Y-zeolite. The molecular sieve is most preferably beta zeolite, ZSM-5 zeolite, or SSZ-39.

The silver-containing extruded molecular sieve substrate may be formed by any known means. Typically, the silver-containing molecular sieve is extruded to form a flow-through or filter substrate, and is preferably extruded to form a honeycomb flow-through monolith. Extruded molecular sieve substrates and honeycomb bodies, and processes for making them, are known in the art. See, for example, U.S. Pat. Nos. 5,492,883, 5,565,394, and 5,633,217 and U.S. Pat. No. Re. 34,804. Typically, the molecular sieve material is mixed with a permanent binder such as silicone resin and a temporary binder such as methylcellulose, and the mixture is extruded to form a green honeycomb body, which is then calcined and sintered to form the final extruded molecular sieve substrate.

The silver-containing extruded molecular sieve substrate may be formed as a flow-through or filter substrate. Preferably, the silver-containing extruded molecular sieve substrate is a flow-through substrate.

If formed as a flow-through substrate, it is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval.

If formed as a filter substrate, the silver-containing extruded molecular sieve substrate is preferably a wall-flow monolith filter. The channels of a wall-flow filter are alternately blocked, which allow the exhaust gas stream to enter a channel from the inlet, and then flow through the channel walls, and exit the filter from a different channel leading to the outlet. Particulates in the exhaust gas stream are thus trapped in the filter.

The molecular sieve may contain silver prior to extruding such that the silver-containing extruded molecular sieve substrate is produced by the extrusion procedure. If the molecular sieve contains silver prior to extrusion, the silver may be added to the molecular sieve to form a silver-containing molecular sieve by any known means, the manner of addition is not considered to be particularly critical. For example, a silver compound (such as silver nitrate) may be added to the molecular sieve by impregnation, adsorption, ion-exchange, incipient wetness, precipitation, spray drying, or the like.

If an extruded molecular sieve substrate is first formed without silver, the extruded molecular sieve monolith is then loaded with silver to produce the silver-containing extruded molecular sieve substrate. Preferably, the extruded molecular sieve monolith is subjected to an impregnation procedure to load silver onto the molecular sieve monolith.

Preferably, the silver-containing extruded molecular sieve substrate comprises from 1 to 700 $g/ft^3$ silver, more preferably from 10 to 200 $g/ft^3$ silver.

Preferably, the three-way catalyst is prepared by depositing the three-way catalyst composition on the silver-containing extruded molecular sieve substrate using washcoat procedures. Washcoating is well-known in the art. A representative process for preparing the three-way catalyst using a washcoat procedure is set forth below. It will be understood that the process below can be varied according to different embodiments of the invention.

The washcoating is preferably performed by first slurrying finely divided particles of the three-way catalyst in an appropriate solvent, preferably water, to form a slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers or promoters may also be incorporated in the slurry as a mixture of water soluble or water-dispersible compounds or complexes.

The silver-containing extruded molecular sieve substrate may then be coated one or more times with the slurry such that there will be deposited on the silver-containing extruded molecular sieve substrate the desired loading of the three-way catalyst.

After the silver-containing extruded molecular sieve substrate has been coated with the three-way catalyst composition slurry, the coated substrate is preferably dried and then calcined by heating at an elevated temperature to form the three-way catalyst. Preferably, the calcination occurs at 400 to 600° C. for approximately 1 to 8 hours.

The three-way catalyst coating can cover the total length of the silver-containing extruded molecular sieve substrate, or alternately can only cover a portion of the total length of the substrate such that only an inlet zone or outlet zone of catalyst coating is formed. Preferably, the entire length of the silver-containing extruded molecular sieve substrate is coated with the three-way catalyst slurry so that a washcoat of the three-way catalyst covers the entire surface of the substrate.

In one embodiment, the palladium component and the rhodium component are located in the same layer of the three-way catalyst such that they are washcoated together onto the silver-containing extruded molecular sieve substrate. In a separate embodiment, the palladium component and the rhodium component are located in different layers. Preferably, the first layer comprises the palladium component and the second layer comprises the rhodium component. The first layer is preferably disposed on the substrate and the second layer is preferably deposited on the first layer. The two layers are preferably deposited using washcoat procedures as described above. Alternatively, the palladium component and the rhodium component may be zoned as an inlet zone and an outlet zone within a single layer.

The invention also includes an exhaust system for internal combustion engines comprising the three-way catalyst. The exhaust system preferably comprises one or more additional after-treatment devices capable of removing pollutants from internal combustion engine exhaust gases.

Preferably, the exhaust system comprises a close-coupled catalyst and the three-way catalyst of the invention. The close-coupled catalyst is located upstream of the three-way catalyst. Preferably, a particulate filter may also be added to this system. The particulate filter may be located downstream of the close-coupled catalyst and upstream of the three-way catalyst, or the particular filter may be located downstream of the three-way catalyst.

Close-coupled catalysts are well known in the art. Close-coupled catalysts are typically utilized to reduce hydrocarbon emissions during cold start period following the start of the engine when the temperature, as measured at the three-way catalyst, will be below a temperature ranging from about 150 to 220° C. Close-coupled catalysts are located within the engine compartment, typically adjacent to the exhaust manifold and beneath the hood; so that they are exposed to high temperature exhaust gas immediately exiting the engine after the engine has warmed up.

The close-coupled catalyst preferably comprises a substrate structure coated with a catalyst layer of a heat-resistant inorganic oxide containing at least one noble metal selected from Pt, Pd and Rh. The heat-resistant substrate is typically a monolith substrate, and preferably a ceramic substrate or metallic substrate. The ceramic substrate may be made of any suitable heat-resistant refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. The metallic substrate may be made of any suitable metal, and in particular heat-resistant metals and metal alloys such as titanium and stainless steel as well as ferritic alloys containing iron, nickel, chromium, and/or aluminum in addition to other trace metals (typically, rare earth metals).

The substrate is preferably a flow-through substrate, but may also be a filter substrate. The flow-through substrates preferably have a honeycomb structure with many small, parallel thin-walled channels running axially through the substrate and extending throughout the substrate. If the substrate is a filter substrate, it is preferably a wall-flow monolith filter. The channels of a wall-flow filter are alternately blocked, which allow an exhaust gas stream to enter a channel from the inlet, and then flow through the channel walls, and exit the filter from a different channel leading to the outlet. Particulates in the exhaust gas stream are thus trapped in the filter.

The catalyst layer of the close-coupled catalyst is typically added to the substrate as a washcoat that preferably comprises one or more inorganic oxides and one or more platinum group metals. The inorganic oxide most commonly includes oxides of Groups 2, 3, 4, 5, 13 and 14 elements. Useful inorganic oxides preferably have surface areas in the range 10 to 700 m$^2$/g, pore volumes in the range 0.1 to 4 mL/g, and pore diameters from about 10 to 1000 Angstroms. The inorganic oxide is preferably alumina, silica, titania, zirconia, niobia, molybdenum oxides, rare earth oxides (in particular ceria, lanthanum or neodymium oxide), or mixed oxides or composite oxides of any two or more thereof, e.g. silica-alumina, ceria-zirconia or alumina-ceria-zirconia, and can also be a zeolite. The PGMs comprise one or more of platinum, palladium, and rhodium. The close-coupled catalyst may contain other metals or metal oxides as well.

In another useful embodiment, the exhaust system may also preferably comprise a conventional oxidation catalyst component and the three-way catalyst of the invention. In this configuration, the exhaust system will preferably contain valves or other gas-directing means such that during the cold-start period (below a temperature ranging from about 150 to 220° C., as measured at the three-way catalyst, the exhaust gas is directed to contact the three-way catalyst before flowing to the conventional oxidation catalyst component. Once the after-treatment device(s) reaches the operating temperature (about 150 to 220° C., as measured at the three-way catalyst), the exhaust gas flow is then redirected to contact the conventional oxidation catalyst component prior to contacting the three-way catalyst. A particulate filter may also be added to this by-pass system. U.S. Pat. No. 5,656,244, the teachings of which are incorporated herein by reference, for example, teaches means for controlling the flow of the exhaust gas during cold-start and normal operating conditions.

The following examples merely illustrate the invention. Those skilled in the art will recognize many variations that are within the spirit of the invention and scope of the claims.

EXAMPLE 1: PREPARATION OF CATALYSTS OF THE INVENTION

Catalyst 1A: Ag on Extruded Beta Zeolite+Pd—Rh Layer

A beta zeolite monolith (300 cpsi, 10.5 mil thickness, formed by extruding beta zeolite into a honeycomb monolith, and containing 55% beta zeolite; see, e.g., U.S. Pat. Nos. 5,492,883, 5,565,394, and 5,633,217) is impregnated with an aqueous silver nitrate solution, followed by drying, and calcining by heating at 500° C. for 4 hours to achieve an Ag loading of 140 g/ft$^3$.

The Ag/beta zeolite monolith is then coated with a Pd—Rh TWC layer consisting of ceria-zirconia-alumina mixed oxide as the support for Pd and ceria-zirconia mixed oxide as the support for Rh. The Pd loading is 68 g/ft$^3$ and the Rh loading is 2 g/ft$^3$. The coated substrate is dried, and then calcined by heating at 500° C. for 4 hours.

EXAMPLE 2: COMPARATIVE CATALYST PREPARATION

Comparative Catalyst 2A: Ceramic Substrate+Pd—Rh Layer

Comparative Catalyst 2A is prepared according to the same procedure as Catalyst 1A with the exception that a cordierite substrate monolith (400 cpsi, 6.5 mil thickness) is used in place of the Ag/beta zeolite monolith. The Pd loading is 68 g/ft$^3$ and the Rh loading is 2 g/ft$^3$.

Comparative Catalyst 2B: Ceramic Substrate+Pd Layer and Rh Layer

Ceramic monolith (900 cpsi, 2.5 mil thickness) is coated with a first layer consisting of Pd, ceria-zirconia-alumina mixed oxide and barium hydroxide. The coated substrate is dried, and calcined by heating at 500° C. for 4 hours. A second layer consisting of Rh, ceria-zirconia mixed oxide and alumina is then coated onto the first layer, followed by drying and calcination at 500° C. for 4 hours. The Pd loading is 78 g/ft$^3$ and the Rh loading is 2 g/ft$^3$.

Comparative Catalyst 2C: Ceramic Substrate+Pd Layer and Rh Layer

Ceramic monolith (900 cpsi, 2.5 mil thickness) is coated with a first layer consisting of Pd, ceria-zirconia mixed oxide, alumina and barium hydroxide. The coated substrate is dried, and calcined by heating at 500° C. for 4 hours. A second layer consisting of Rh, ceria-zirconia mixed oxide and alumina is then coated onto the first layer, followed by drying and calcination at 500° C. for 4 hours. The Pd loading is 78 g/ft$^3$ and the Rh loading is 2 g/ft$^3$.

EXAMPLE 3: LABORATORY TESTING PROCEDURES AND RESULTS

Core samples (2.54 cm×8.4 cm) of Catalyst 1A and Comparative Catalyst 2A are aged under flow-through conditions in a furnace under hydrothermal conditions (5% H$_2$O, balance air) at 800° C. for 80 hours. The cores are then tested for hydrocarbon adsorption in a laboratory reactor, using a feed gas stream that is prepared by adjusting the mass flow of the individual exhaust gas components. The gas flow rate is maintained at 21.2 L min$^{-1}$ resulting in a Gas Hourly Space Velocity of 30,000 h$^{-1}$ (GHSV=30,000 h$^{-1}$).

The catalysts are pretreated at 650° C. in a gas flow of 2250 ppm O$_2$, 10% CO$_2$, 10% H$_2$O, and the balance nitrogen, before cooling to room temperature. Following the pretreatment, the catalyst undergoes a hydrocarbon (HC) adsorption step in which the catalyst is contacted for 30 seconds with a HC-containing gas consisting of 1500 ppm (C$_i$ basis) hydrocarbons (17 vol. % toluene, 24 vol. % isopentane, and 59 vol. % propene), 1000 ppm NO, 1000 ppm CO, 2250 ppm O$_2$, 10% H$_2$O, 10% CO$_2$, and the balance nitrogen. The HC adsorption step is then followed by a HC desorption period in which the catalyst is subjected to a desorption gas consisting of 200 ppm (C$_1$ basis) hydrocarbons, 300 ppm O$_2$, 10% H$_2$O, 10% CO$_2$, and the balance nitrogen.

The HC emissions results during the adsorption period and oxidation period, as well as total HC removed, are shown in Table 1.

EXAMPLE 4: ENGINE TESTING PROCEDURES

System 4A comprises the Comparative Catalyst 2B in the close-coupled position and a downstream Catalyst 1A in the underfloor position. Comparative System 4B comprises the Comparative Catalyst 2C in the close-coupled position and a downstream Comparative Catalyst 2A in the underfloor position. Each system is aged on a 3.5-L gasoline engine under 4-mode conditions for 100 hours with the close-couple catalyst bed peak temperature at 1610° F. The aged systems are then evaluated on a 3.5-L gasoline vehicle. NMHC (non-methane hydrocarbon) and $NO_x$ emissions from the tailpipe over the Federal Test Procedure (FTP) cycle are compared in Table 2. System 4A demonstrates a reduced NMHC emission and comparable NO emission.

TABLE 1

HC Storage Capacity and Oxidation Results

| Catalyst | % HC adsorbed (30 sec; 80° C.) | % HC oxidized (80-650° C.) | Total % HC removed |
|---|---|---|---|
| 1A | 82.7 | 65.9 | 69.7 |
| 2A* | 9.1 | 73.4 | 54.9 |

*Comparative Example

TABLE 2

NMHC and $NO_x$ Emission Results

| System | NMHC emission (g/mile) | $NO_x$ emission (g/mile) |
|---|---|---|
| 4A | 0.015 ± 0.001 | 0.034 ± 0.004 |
| 4B* | 0.022 ± 0.002 | 0.028 ± 0.006 |

*Comparative Example

We claim:

1. A three-way catalyst comprising: (1) a palladium component comprising palladium and a ceria-zirconia-alumina mixed or composite oxide; and (2) a rhodium component comprising rhodium and a zirconia-containing material, wherein the palladium component and the rhodium component are coated onto a silver-containing extruded molecular sieve substrate.

2. The three-way catalyst of claim 1 wherein the palladium component and the rhodium component are located in the same layer.

3. The three-way catalyst of claim 1 wherein the palladium component and the rhodium component are located in different layers.

4. The three-way catalyst of claim 1 wherein the zirconia-containing material is a ceria-zirconia mixed or composite oxide.

5. The three-way catalyst of claim 1 wherein the silver-containing extruded molecular sieve substrate is a flow-through substrate.

6. The three-way catalyst of claim 1 wherein the silver-containing extruded molecular sieve substrate is a filter substrate.

7. The three-way catalyst of claim 1 wherein the silver-containing extruded molecular sieve substrate comprises a molecular sieve having a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, MFI, FER, MWW, EUO, CON, BEA, FAU, MOR, and EMT.

8. The three-way catalyst of claim 7 wherein the molecular sieve is selected from the group consisting of SAPO-34, SSZ-33, SSZ-13, SSZ-39, beta zeolite, ZSM-5 zeolite, and Y-zeolite.

9. The three-way catalyst of claim 1 wherein the silver-containing extruded molecular sieve substrate comprises from 1 to 700 $g/ft^3$ silver.

10. A method for treating an exhaust gas from an internal combustion engine comprising contacting the exhaust gas with a three-way catalyst of claim 1.

* * * * *